United States Patent [19]

Thompson

[11] 4,069,301
[45] Jan. 17, 1978

[54] METHOD OF MAKING TITANIUM DISULFIDE

[75] Inventor: Arthur H. Thompson, New Providence, N.J.

[73] Assignee: Exxon Research & Engineering Co., Linden, N.J.

[21] Appl. No.: 641,425

[22] Filed: Dec. 17, 1975

[51] Int. Cl.² .................. C01G 23/00; C01B 17/00
[52] U.S. Cl. .......................................... 423/565
[58] Field of Search .................. 423/561, 562, 565

[56] References Cited

U.S. PATENT DOCUMENTS

| | | | |
|---|---|---|---|
| 3,079,229 | 2/1963 | Garrett | 423/562 |
| 3,342,552 | 9/1967 | Niermann | 423/561 Y |

OTHER PUBLICATIONS

Jennin et al., "Compt. Rend" 248, 2875–2877, 1959.
Kenichiro et al., "Chem. Abstracts", vol. 80, 1974, p. 86551s.

*Primary Examiner*—Jack Cooper
*Attorney, Agent, or Firm*—Joseph J. Dvorak

[57] ABSTRACT

Metallic titanium and a stoichiometric excess of elemental sulfur are reacted at a temperature above about 630° C. but below the critical temperature of elemental sulfur under superatmospheric pressures sufficiently great to insure the presence of molten elemental sulfur to produce titanium disulfide. Upon completion of the reaction, the titanium disulfide is cooled rapidly from at least about 630° C. to minimize formation of titanium trisulfide and titanium disulfide is then separated from the elemental sulfur.

6 Claims, No Drawings ent 4,069,301

METHOD OF MAKING TITANIUM DISULFIDE

BACKGROUND OF THE INVENTION

The present invention relates to the production of titanium disulfide and more particularly to the production of titanium disulfide by the direct reaction of metallic titanium and elemental sulfur.

Titanium disulfide has a layered structure with each layer comprising titanium atoms sandwiched between sulfur atoms and the separate layers being bound together by van der Waal forces. The layered structure of titanium disulfide imparts unique properties to the compound. For example, Lewis bases can be intercalated and deintercalated from the titanium disulfide structure. The intercalated titanium disulfide can be used in numerous applications, including use as a lubricant. The unintercalated titanium disulfide can be used as a cathode-active material in electrochemical cells. Because titanium disulfide can be intercalated and deintercalated, the cathode-active material can be used in secondary cells. To be useful as a cathode-active material, titanium disulfide should possess a number of properties. Titanium disulfide should have a high surface area, i.e. a fine particle size, to provide ready access of the electrolyte. Not only should the titanium disulfide have a fine particle size, but there should be a small variation in particle size so that a cathode structure with a controlled porosity can be prepared. Chemically the titanium disulfide should be stoichiometric, i.e. $TiS_2$, in order to insure rapid intercalation and deintercalation. Also, the titanium disulfide should have a low impurity content to minimize interference of the contaminants with electrochemical properties of titanium disulfide. In addition to the preceding required physical properties, the titanium disulfide should be capable of being prepared by an economic process capable of being expanded to an industrial scale.

BRIEF SUMMARY OF THE INVENTION

Generally speaking, the present invention contemplates a process for the production of titanium disulfide by the direct reaction of metallic titanium with elemental sulfur. Metallic titanium is contacted with a stoichiometric excess of elemental sulfur at a reaction temperature between about 630° C. and 1040° C. under superatmospheric pressures at least equivalent to the partial pressure of elemental sulfur at the reaction temperature so that the reaction is conducted in the presence of liquid sulfur. When the metallic titanium is consumed, the resulting titanium disulfide is cooled rapidly at least from 630° C. to minimize the formation of titanium trisulfide. The resulting mixture of titanium disulfide and elemental sulfur is treated to separate titanium disulfide from the elemental sulfur.

DETAILED DESCRIPTION

In carrying the present invention into practice, metallic titanium is contacted with elemental sulfur at a reaction temperature of between about 630° C. and 1040° C. Elemental sulfur is present in amounts sufficient to satisfy stoichiometrically the following reaction:

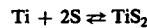

Ti + 2S ⇌ $TiS_2$ to provide a sulfur pressure at least equivalent to the vapor pressure at the reaction temperature and to provide a bath of molten sulfur. The reaction is conducted at a pressure at least equal to the partial pressure of elemental sulfur in order to maintain a bath of molten elemental sulfur. Upon completion of the reaction between metallic titanium and elemental sulfur, the reaction products are cooled rapidly, at least from 630° C. to minimize formation of titanium trisulfide. After cooling, the titanium disulfide is separated from the elemental sulfur.

The rate of reaction between metallic titanium and elemental sulfur under the conditions in accordance with the present process are sufficiently rapid that most forms of metallic titanium can be employed. Thus, titanium sponge, titanium sheet, titanium wire, and titanium powder can all be employed as feed material. However, the reaction between metallic titanium and elemental sulfur under the conditions of the present invention is highly spontaneous and energetic, and the more massive forms of metallic titanium are advantageously used in order to minimize the potential risks of explosions caused by the rapid increase in temperature generated by the rapid release of the heat of reaction.

Because titanium trisulfide is unstable in the presence of molten elemental sulfur at temperatures exceeding 630° C., an excess of elemental sulfur can be advantageously employed. For example, the use of an excess amount of elemental sulfur minimizes the production of titanium-rich titanium disulfide which displays inferior battery properties in that the excess titanium atoms are located between the sulfur layers held together by van der Waal forces and in such locations impede intercalation and deintercalation. The use of excess elemental sulfur also has the advantage of minimizing the measuring and weighing of the amounts of metallic titanium and elemental sulfur which helps lower processing costs.

Elemental sulfur is used in amounts sufficient to satisfy the stoichiometry of the reaction between metallic titanium and elemental sulfur to form titanium disulfide, to provide the required partial pressure of elemental sulfur and to provide a bath of molten sulfur in the reaction chamber. In most instances, the foregoing requirements can be satisfied by employing 55.68 weight % elemental sulfur and 44.4 weight % elemental Ti with additional elemental sulfur in the amounts of at least 20 mg per cc of reactor volume; advantageously the amount of additional elemental sulfur employed is between about 20 mg/cc and 40 mg/cc.

Metallic titanium is contacted with elemental sulfur at a reaction temperature between about 630° C. and 1040° C. At temperatures below about 630° C., titanium trisulfide is stable in the presence of elemental sulfur and therefore the reaction must be conducted at temperatures above 630° C. if the presence of titanium trisulfide is to be minimized. The critical temperature of elemental sulfur is 1040° C. and therefore the process in accordance with the present invention must be conducted below that temperature. In terms of rates of reaction and equipment requirements, it is advantageous to conduct the reaction between metallic titanium and elemental sulfur between about 630° C. and 750° C. Most advantageously, the process in accordance with the present invention is conducted at temperatures between about 630° C. and 675° C. Use of temperatures within the foregoing ranges insures rapid and complete reaction between titanium and elemental sulfur and avoids the high pressures generated by elemental sulfur at temperatures in excess of 750° C.

The use of temperatures within the foregoing ranges is also important in the production of a titanium disulfide product that can be used in secondary battery cathodes. At temperatures between about 630° C. and 700° C., the resulting product of the reaction between titanium and elemental sulfur generally has a particle size range between about 1μ and 100μ and advantageously between about 1μ and 10μ. Not only are the particles of proper size for use as battery cathode material, but the distribution of particles falls within a narrow range which is highly useful in battery applications in that the porosity of the cathode structure can be readily controlled. Another advantage of reacting metallic titanium with elemental sulfur within the foregoing temperatures ranges is that the resulting titanium disulfide has a crystalline structure with minimal imperfections. In layered structures with minimal crystal imperfections diffusion and transport of Lewis bases are enhanced thereby improving the cathode action of these materials.

The reaction between metallic titanium and elemental sulfur is rapid and in most instances is complete within 2 hours. In practice, it is advantageous to hold the feed materials and/or the reaction products at the reaction temperature for a period between about 0.5 and 2 hours. Holding times within the foregoing ranges insure that the reaction between the metallic titanium in elemental sulfur is complete and provides an annealing period during which any crystalline imperfections introduced during the initial reaction can be eliminated by diffusion processes.

Upon completion of the reaction, the titanium disulfide and molten sulfur are rapidly cooled from at least about 630° C. to minimize the formation of titanium trisulfide which is stable in molten sulfur at temperatures below 630° C. In most instances rapid cooling from at least 630° C. will be conducted to ambient temperatures, but it is not necessary to rapidly cool below about 100° C. since the kinetics of the formation of titanium trisulfide from titanium disulfide and elemental sulfur are such that the production of titanium trisulfide is minimal. Although it is preferred to cool rapidly from 630° C. to the ambient temperature, rapid cooling can be conducted from the reaction temperature. However, if reaction temperatures above about 700° C. are employed, it is preferred to slow cool down to between about 630° C. and 675° C. and then rapidly cool from that temperature to minimize both crystalline imperfections and the subsequent formation of titanium trisulfide.

After cooling, titanium disulfide is separated from elemental sulfur. Known separation techniques that do not decompose or otherwise react with the titanium disulfide can be employed. For example, the mixture of elemental sulfur and titanium disulfide can be treated with carbon disulfide or trichloroethylene to dissolve the elemental sulfur. The titanium disulfide can then be separated from the solution and washed in preparation for use as a battery cathode meterial. Alternatively, the elemental sulfur can be separated from the titanium disulfide by vacuum distillation techniques.

In carrying the present invention into practice, metallic titanium and elemental sulfur in amounts sufficient to satisfy the stoichiometry of the reaction therebetween to form titanium disulfide, to establish a sulfur vapor at the reactive temperature and to provide a molten sulfur both during the reaction are added to a suitable reaction vessel. The reaction vessel is evacuated and then sealed. The sealed vessel is heated to the reaction temperature, preferably at a controlled rate to minimize the hazards associated with the highly exothermic and spontaneous reaction. The heated vessel is held at the reaction temperature long enough to insure completion of the reaction, homogenization of the products and annealing. The reaction vessel is then cooled rapidly from about 630° C. to less than 100° C. to minimize formation of titanium trisulfide. The reaction products are recovered from the reaction vessel and the titanium disulfide is separated from the elemental sulfur by known techniques.

Although the present invention has been described in terms of a batch process, it is an advantageous feature of the present process that it can be conducted on a continuous basis. For example, titanium metal is conveyed to a reaction zone containing elemental, liquid sulfur at a temperature between about 630° C. and 750° C. and in which the sulfur partial pressure is equal to the vapor pressure over liquid sulfur at the reaction temperature. After the titanium metal has completely reacted with the elemental sulfur to form titanium disulfide the product titanium disulfide may be removed as a slurry of titanium disulfide crystalline material in sulfur liquid and pumped to a heat exchanger where the temperature of the slurry is rapidly lowered to about 200° C. This slurry is then passed through a filter where the titanium disulfide is removed and the liquid sulfur may be advantageously returned to the reaction zone. The product titanium disulfide may then be washed to remove the elemental sulfur in some solvent such as carbon tetrachloride.

Titanium disulfide produced by the process in accordance with the present invention has numerous properties that make it highly desirable as an active cathode material for secondary batteries. The titanium disulfide is stoichiometric, i.e. it corresponds to $TiS_x$ wherein $x$ has a numerical value between about 1.90 and 2.00, advantageously between about 1.98 and 2.00, and most advantageously about 2. In addition to stoichiometry, titanium disulfide produced by the present process has a fine particle size of narrow distribution and minimal crystalline imperfections. All of these properties make titanium disulfide produced by the present process particularly advantageous for use as a cathode active material in secondary batteries.

In order to give those skilled in the art a better appreciation of the present invention, the following illustrative examples are given:

EXAMPLE 1

A titanium wire, 0.050 inch in diameter, and weighing 2 grams, was placed in a thick-walled quartz tube with a stoichiometric amount of sulfur and an additional amount of sulfur equivalent to 20 milligrams per cubic centimeter of tube volume. The tube was then evacuated and sealed. The sealed tube was heated to 640° C. over a period of 1 hour (slow heating was used as a safety precaution), and then reaction was permitted to proceed for 2 hours. Thereafter, the tube was quenched in cold water to prevent the formation of titanium trisulfide. The titanium disulfide and elemental sulfur were removed from the tube and the titanium disulfide was separated from the elemental sulfur by distillation. The titanium disulfide was analyzed and found to have a composition equivalent to $TiS_2$. The particle size of the titanium disulfide was between 1μ and 10μ in basal extent.

What is claimed is:

1. A process for producing titanium disulfide by reacting metallic titanium with elemental sulfur at elevated temperatures which comprises: charging a reaction vessel solely with metallic titanium and elemental sulfur; said sulfur being charged in an amount sufficient to satisfy the stoichiometry of the reaction between metallic titanium and elemental sulfur to form titanium disulfide, to provide a sulfur pressure at least equal to the vapor pressure of elemental sulfur at a reaction temperature between about 630° C and 1040° C and to insure the presence of molten elemental sulfur; maintaining the metallic titanium in contact with the elemental sulfur at a reaction temperature of between 630° C and 1040° C whereby titanium disulfide is produced; and, after the reaction between elemental sulfur and metallic titanium is complete, cooling the products of reaction rapidly from at least 630° C to below 100° C such that formation of titanium trisulfide is minimized.

2. The process as described in claim 1 wherein the reaction temperature is between about 630° C. and 750° C.

3. The process as described in claim 1 wherein the titanium disulfide is cooled to about 630° C. from the reaction temperature and then cooled rapidly from 630° C. to ambient temperature, said rapid cooling such that formation of titanium trisulfide is minimized.

4. The process as described in claim 1 wherein the metallic titanium and elemental sulfur are placed in a reaction vessel, the reaction vessel is evacuated and sealed and the sealed reaction vessel is heated to the reaction temperature.

5. The process as described in claim 4 wherein the amount of sulfur in excess of that required to satisfy the stoichiometry of the reaction between titanium and elemental sulfur to form titanium disulfide is at least about 20 milligrams per cubic centimeter of the reaction vessel.

6. The process as described in claim 4 wherein the reaction vessel is held at the reaction temperature between about 0.5 and 2 hours.

* * * * *